United States Patent
Itoh et al.

(10) Patent No.: US 11,760,575 B2
(45) Date of Patent: Sep. 19, 2023

(54) CONVEYANCE DEVICE AND PLANAR CONVEYANCE DEVICE

(71) Applicant: ITOH DENKI CO., LTD., Kasai (JP)

(72) Inventors: Kazuo Itoh, Kasai (JP); Tatsuhiko Nakamura, Kasai (JP); Hideo Naiki, Kasai (JP); Kentarou Iwasawa, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 0 days.

(21) Appl. No.: 17/794,844

(22) PCT Filed: Jan. 26, 2021

(86) PCT No.: PCT/JP2021/002539
§ 371 (c)(1),
(2) Date: Jul. 22, 2022

(87) PCT Pub. No.: WO2021/153530
PCT Pub. Date: Aug. 5, 2021

(65) Prior Publication Data
US 2023/0087156 A1  Mar. 23, 2023

(30) Foreign Application Priority Data

Jan. 27, 2020 (JP) ................ 2020-011228

(51) Int. Cl.
*B65G 13/10* (2006.01)
*B65G 13/04* (2006.01)
(Continued)

(52) U.S. Cl.
CPC ............ *B65G 13/10* (2013.01); *B65G 13/04* (2013.01); *B65G 39/00* (2013.01); *B65G 47/54* (2013.01)

(58) Field of Classification Search
None
See application file for complete search history.

(56) References Cited

U.S. PATENT DOCUMENTS 3,978,975 A * 9/1976 Herbes ................ B65G 13/065
198/782
6,516,936 B2 * 2/2003 Nakamura ............ B65G 13/10
198/782
(Continued)

FOREIGN PATENT DOCUMENTS

CN  111689198 A * 9/2020
CN  112173584 A * 1/2021 ............ B65G 15/30
(Continued)

OTHER PUBLICATIONS

International Preliminary Report on Patentability and Written Opinion, dated Jul. 28, 2022 in International Patent Application No. PCT/JP2021/002539.
(Continued)

*Primary Examiner* — Joseph A Dillon, Jr.
(74) *Attorney, Agent, or Firm* — Wood, Phillips, Katz, Clark & Mortimer

(57) ABSTRACT

A conveyance device and a planar conveyance apparatus capable of carrying out an article in any direction. The conveyance device includes an energizing mechanism unit configured to energize and move an article and a rotation mechanism unit configured to rotate the energizing mechanism unit itself, and is capable of changing a moving direction of the article by rotating the energizing mechanism unit with the rotation mechanism unit. The energizing mechanism unit includes an energizing mechanism side motor, and the energizing mechanism side motor includes a coil on a center side and an outer body surrounding the coil, and is an outer rotor type motor in which the outer body rotates. The energizing mechanism side motor is disposed such that a central shaft of the outer body is in a substantially horizontal posture, and the outer body energizes the article
(Continued)

by coming into contact with the article directly or through a freely-rotating rotor interposed therebetween.

11 Claims, 15 Drawing Sheets

(51) Int. Cl.
  *B65G 39/00* (2006.01)
  *B65G 47/54* (2006.01)

(56) References Cited

U.S. PATENT DOCUMENTS

| | | | |
|---|---|---|---|
| 9,499,341 B2* | 11/2016 | Wilkins | B65G 39/025 |
| 9,868,594 B2* | 1/2018 | Itoh | B65G 43/10 |
| 9,908,706 B1* | 3/2018 | Ribarov | B64D 9/00 |
| 9,926,140 B2* | 3/2018 | Itoh | G01M 99/00 |
| 9,944,468 B2 | 4/2018 | Itoh | B65G 29/00 |
| 10,493,927 B1* | 12/2019 | Widmer | H02G 3/34 |
| 10,518,975 B2* | 12/2019 | Itoh | B65G 43/08 |
| 10,793,367 B1* | 10/2020 | Wedekind | B65G 25/08 |
| 10,843,872 B2* | 11/2020 | Guglielmi | B65G 39/025 |
| 11,008,175 B1* | 5/2021 | Watts | F16M 13/02 |
| 11,319,155 B2* | 5/2022 | Huang | B65G 13/065 |
| 11,352,215 B2* | 6/2022 | Huang | B65G 13/10 |
| 11,365,064 B2* | 6/2022 | Tachibana | B65G 59/00 |
| 2008/0169171 A1 | 7/2008 | Itoh et al. | |
| 2016/0229638 A1* | 8/2016 | Wilkins | B65G 13/065 |
| 2021/0269245 A1* | 9/2021 | Huang | B65G 47/54 |
| 2021/0269252 A1* | 9/2021 | Huang | B65G 13/10 |

FOREIGN PATENT DOCUMENTS

| | | |
|---|---|---|
| CN | 113335845 A * | 9/2021 |
| JP | 07-157031 A | 6/1995 |
| JP | 2004-107019 A | 4/2004 |
| JP | 2008-174318 A | 7/2008 |
| JP | 2012-051680 A | 3/2012 |
| JP | 2015-163547 A | 9/2015 |
| JP | 2015-163549 A | 9/2015 |
| WO | 2019/131826 A1 | 12/2020 |

OTHER PUBLICATIONS

International Search Report, dated Apr. 6, 2021 in International Patent Application No. PCT/JP2021/002539.

* cited by examiner

CONVEYANCE DEVICE AND PLANAR CONVEYANCE DEVICE

BACKGROUND OF THE INVENTION

Field of the Invention

The present invention relates to a conveyance device that conveys an article, and particularly relates to a conveyance device that carries out an article in a plurality of directions or carries in an article from a plurality of directions.

Background Art

In a delivery site, a pickup site, a warehouse, or the like, many kinds of articles may be handled. A large number of articles may be sorted and loaded onto a truck or carried to a specific shelf.

In the prior art, articles are sorted by a sorting system in which a plurality of transfer devices in Patent Documents 1, 2, and 3 are installed.

The transfer devices described in Patent Documents 1 and 2 include a main conveying passage through which articles pass linearly and a sub conveying passage through which the articles are carried out in directions orthogonal to each other, thereby transferring the article to another conveyer line.

The transfer device described in Patent Document 3 includes a main conveying passage passing through articles linearly and discharge means for discharging the article in an oblique direction, thereby transferring the articles to another conveyer line by carrying out the article in the oblique direction.

In the sorting system of the prior art, the conveyor line is complicatedly branched by arranging a large number of transfer devices described above. The article is conveyed by the sorting system, the article is delivered from an original conveyer line to a branch conveyer line branched from the original conveyer line, a carry-out destination is gradually narrowed down, and the article is moved to a target conveyance destination.

Patent Document 1: JP 2015-163549 A
Patent Document 2: JP 2012-51680 A
Patent Document 3: JP 2015-163547 A The transfer device of the prior art selectively carries out the introduced article in two specific directions.

Thus, the sorting system of the prior art becomes a complicatedly branched conveyor line, and becomes considerably large. That is, a large installation place is required to construct the sorting system of the prior art.

Therefore, the present invention has paid attention to the above-described problems of the prior art, and an object of the present invention is to develop a conveyance device and a planar conveyance apparatus having a simple structure and capable of carrying out an article in any direction.

SUMMARY OF THE INVENTION

An aspect to solve the above problem is a conveyance device that includes: an energizing mechanism unit configured to energize and move an article; and a rotation mechanism unit configured to rotate the energizing mechanism unit itself to change a moving direction of the article, wherein the energizing mechanism unit includes an energizing mechanism side motor, the energizing mechanism side motor including: a coil on a center side; and an outer body surrounding the coil, the energizing mechanism side motor being an outer rotor type motor in which the outer body rotates, wherein the energizing mechanism side motor is disposed such that a central shaft of the outer body is in a substantially horizontal posture, and wherein the outer body is configured to come into contact with the article directly or through a freely-rotating rotor interposed therebetween to energize the article.

The "central shaft of the outer body" is a virtual rotation central shaft. In the outer rotor type motor, although a shaft as an object is inserted in a center in many cases, and in many cases the shaft is the "central shaft of the outer body", there may be no shaft as the object.

The "substantially horizontal posture" is a posture closer to be horizontal than the vertical posture.

In the conveyance device of the present aspect, the energizing mechanism side motor is disposed in the energizing mechanism unit. The energizing mechanism side motor is an outer rotor type motor in which the outer body rotates.

In the conveyance device of the present aspect, the article is moved by directly or indirectly coming into contact with the outer body of the outer rotor type motor.

The conveyance device of the present aspect includes the rotation mechanism unit, rotates the energizing mechanism unit with the rotation mechanism unit, and is capable of changing the moving direction of the article.

In the conveyance device of the present aspect, a power transmission member such as a gear is not essential for a machine portion that energizes the article, and the number of parts is small enough.

In the aspect described above, it is desirable that the rotation mechanism unit includes a rotation mechanism side motor, the rotation mechanism side motor including a coil on a center side and an outer body surrounding the coil, the rotation mechanism side motor being an outer rotor type motor in which the outer body rotates, the rotation mechanism side motor is disposed such that a central shaft of the outer body is in a substantially vertical posture, and the outer body is engaged with the energizing mechanism unit directly or indirectly The "central shaft of the outer body" is a virtual rotation central shaft. In the outer rotor type motor, although a shaft as a substantial beings is inserted in a center in many cases, and in many cases the shaft is the "central shaft of the outer body", there may be no shaft as the object.

The "substantially vertical posture" is a posture closer to be vertical than the horizontal posture.

In the conveyance device of the present aspect, the rotation mechanism side motor is disposed in the rotation mechanism unit. The rotation mechanism side motor is an outer rotor type motor in which the outer body rotates.

In the conveyance device of the present aspect, a power transmission member such as a gear is not essential for a machine portion that changes a moving direction of an article, and the number of parts is small enough.

In each aspect described above, it is desirable that the conveyance device further includes a freely-rotatable roller, wherein a part of the freely-rotatable roller is configured to come into contact with the energizing mechanism side motor to energize the article.

In each aspect described above, it is desirable that one or a plurality of the rollers have a degree of freedom in a vertical direction.

It is also possible to adopt a structure in which a friction imparting member is provided on an outer peripheral portion of the outer body of the energizing mechanism side motor, and the energizing mechanism side motor is configured to come into contact with the article to energize the article.

According to the present aspect, the outer body directly comes into contact with the article, and the article can be energized.

Another aspect for solving the same problem is a conveyance device that includes: an energizing mechanism unit configured to energize and move an article; and a rotation mechanism unit configured to rotate the energizing mechanism unit itself to change a moving direction of the article, wherein the rotation mechanism unit includes a rotation mechanism side motor, the rotation mechanism side motor including a coil on a center side and an outer body surrounding the coil, the rotation mechanism side motor being an outer rotor type motor in which the outer body rotates, wherein the rotation mechanism side motor is disposed such that a central shaft of the outer body is in a substantially vertical posture, and wherein the outer body is engaged with the energizing mechanism unit directly or indirectly.

In the conveyance device of the present aspect, the rotation mechanism side motor is disposed in the rotation mechanism unit. The rotation mechanism side motor is an outer rotor type motor in which the outer body rotates.

In the conveyance device of the present aspect, the outer body of the outer rotor type motor directly or indirectly engages with the energizing mechanism unit to rotate the energizing mechanism unit.

In the conveyance device of the present aspect, a power transmission member such as a gear is not essential for a machine portion that changes a moving direction of an article, and the number of parts is small enough.

An aspect of a planar conveyance apparatus includes a plurality of the conveyance devices, the plurality of the conveyance devices being arranged in a planar shape.

According to the planar conveyance apparatus of the present aspect, an article can be fed out in any direction.

The conveyance device and the planar conveyance apparatus of the present invention can carry out the article in any direction with a simple structure.

BRIEF DESCRIPTION OF THE DRAWINGS

FIGS. 13A, 13B, and 13C are diagrams including a base member of the conveyance device adopted in the planar conveyance apparatus illustrated in FIG. 9, in which FIG. 13A is a front view, FIG. 13B is a plan view, and FIG. 13C is a bottom view.

DETAILED DESCRIPTION OF THE PREFERRED EMBODIMENTS

Figure 1:
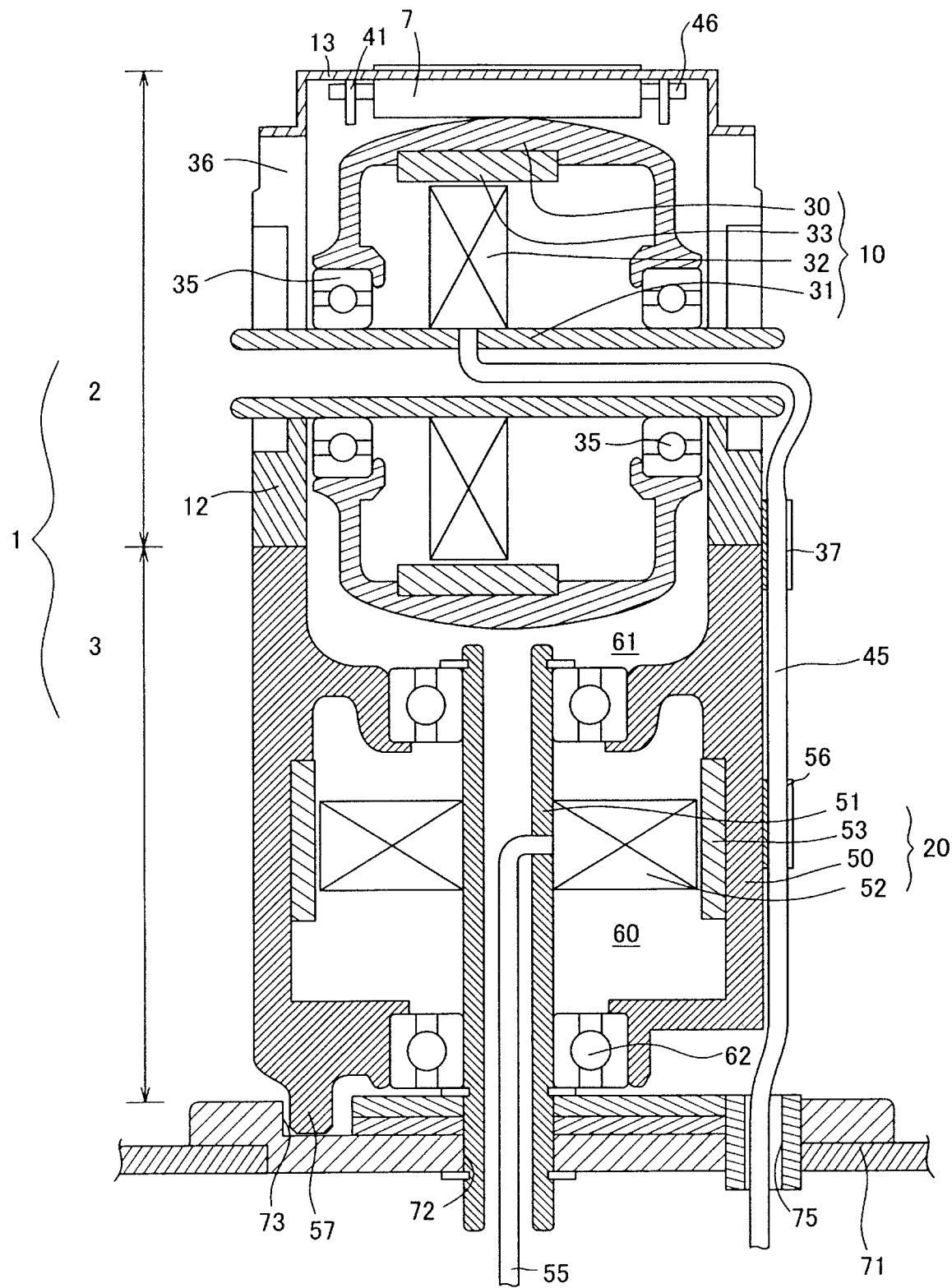
FIG. 1 is a front cross-sectional view of a conveyance device (including a base member of a planar conveyance apparatus) according to an embodiment of the present invention.
Figure 2:
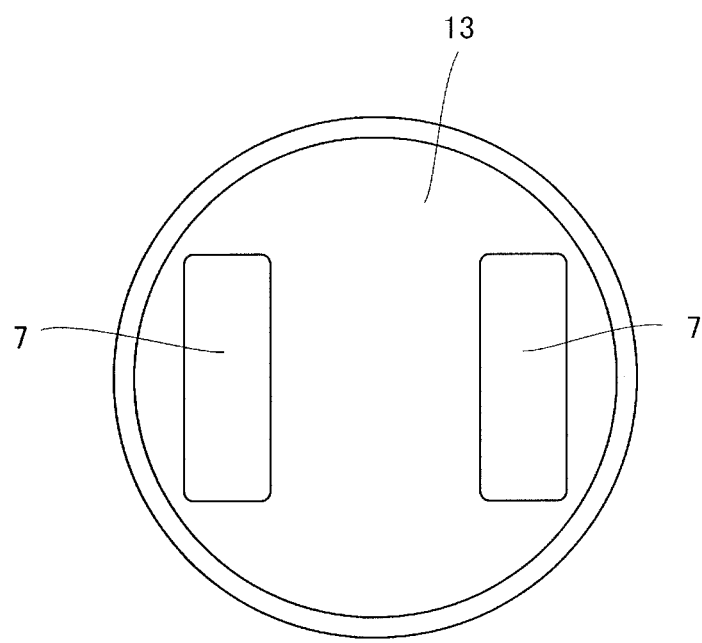
FIG. 2 is a plan view of the conveyance device of FIG. 1.
Figure 3:
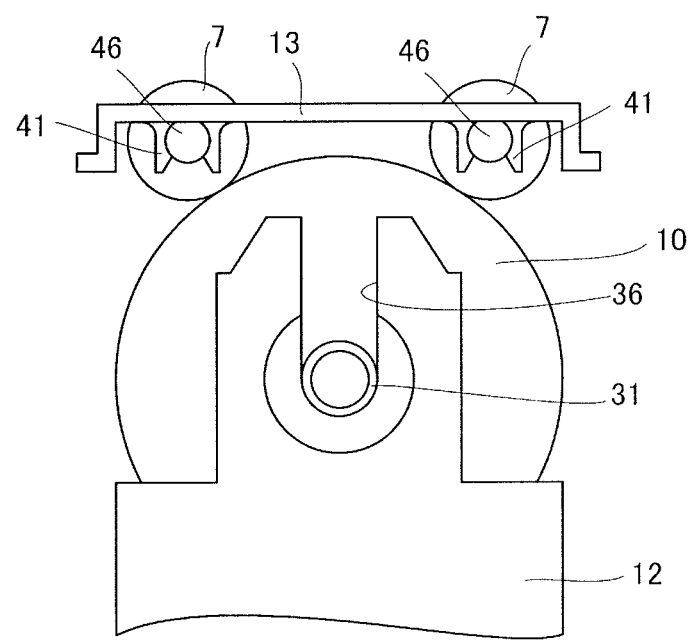
FIG. 3 is a cross-sectional view of an upper side of the conveyance device of FIG. 1.

Hereinafter, embodiments of the present invention will be further described.

A conveyance device 1 of the present embodiment includes an energizing mechanism unit 2 that energizes and moves an article, and a rotation mechanism unit 3 that rotates the energizing mechanism unit itself.

The energizing mechanism unit 2 includes, as a main component, an energizing mechanism side motor 10 constituted by an outer rotor type motor, and the energizing mechanism side motor 10 is installed such that a central shaft 31 is in a horizontal posture.

An outer body 30 of the energizing mechanism side motor 10 rotates. A roller (rotor that freely rotates) 7 is installed at an upper portion of the outer body 30, and the roller 7 rotates by receiving a rotational force from the outer body 30.

The article (not illustrated) is mounted on the roller 7 and is energized and moved by the roller 7. That is, the roller 7 functions as an energizing unit that energizes the article.

The rotation mechanism unit 3 includes, as a main component, a rotation mechanism side motor 20 constituted by an outer rotor type motor, and the rotation mechanism side motor 20 is installed such that a central shaft is in a vertical posture.

An outer body 50 of the rotation mechanism side motor 20 rotates. The energizing mechanism unit 2 is engaged with the outer body 50. Thus, the rotation mechanism side motor 20 rotates, and thereby, the energizing mechanism unit 2 rotates about a vertical axis, and a conveyance direction changes.

Hereinafter, each member will be described.

Figure 4:
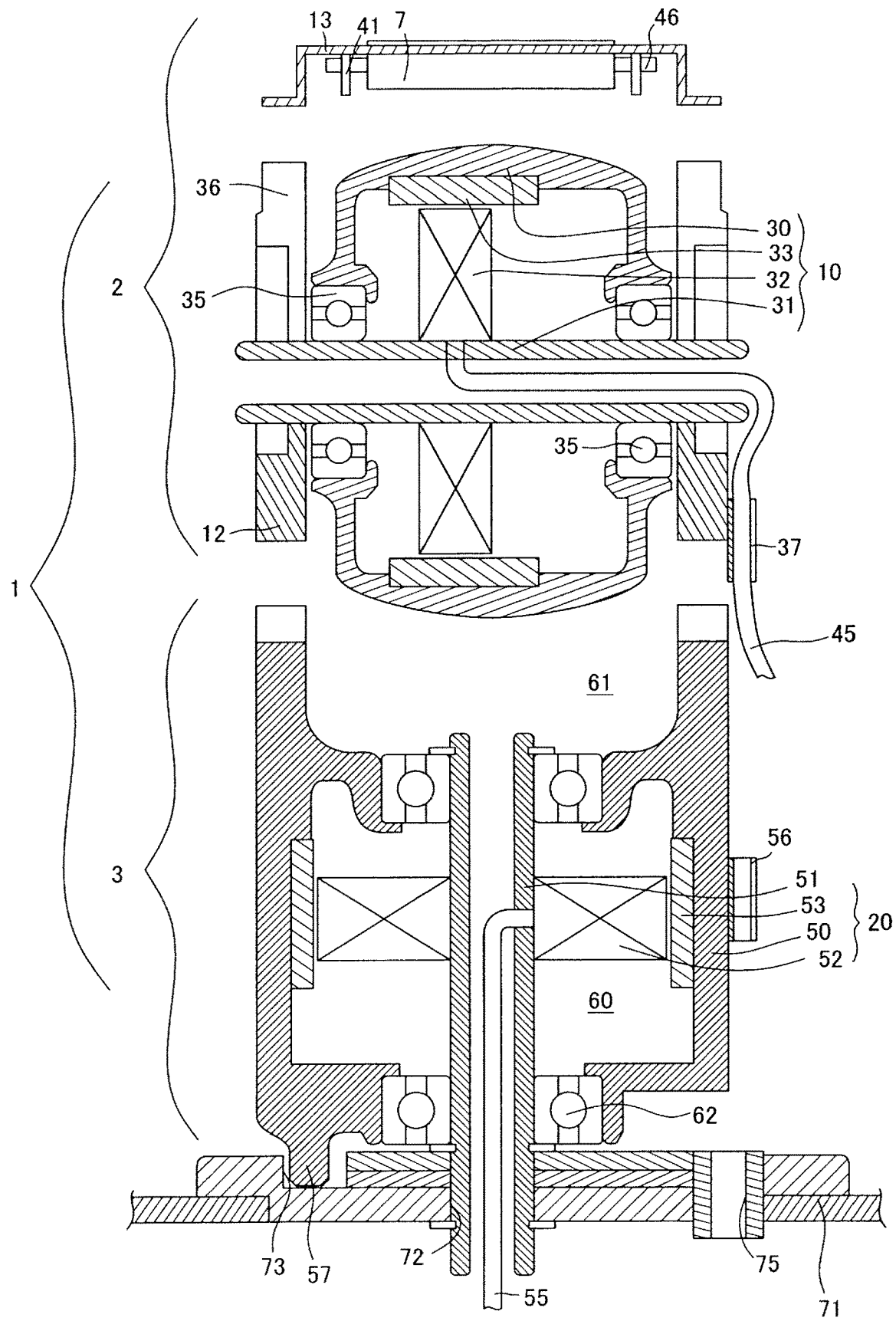
FIG. 4 is a cross-sectional view where the conveyance device of FIG. 1 is separated into an energizing mechanism unit and a rotation mechanism unit.
Figure 5:
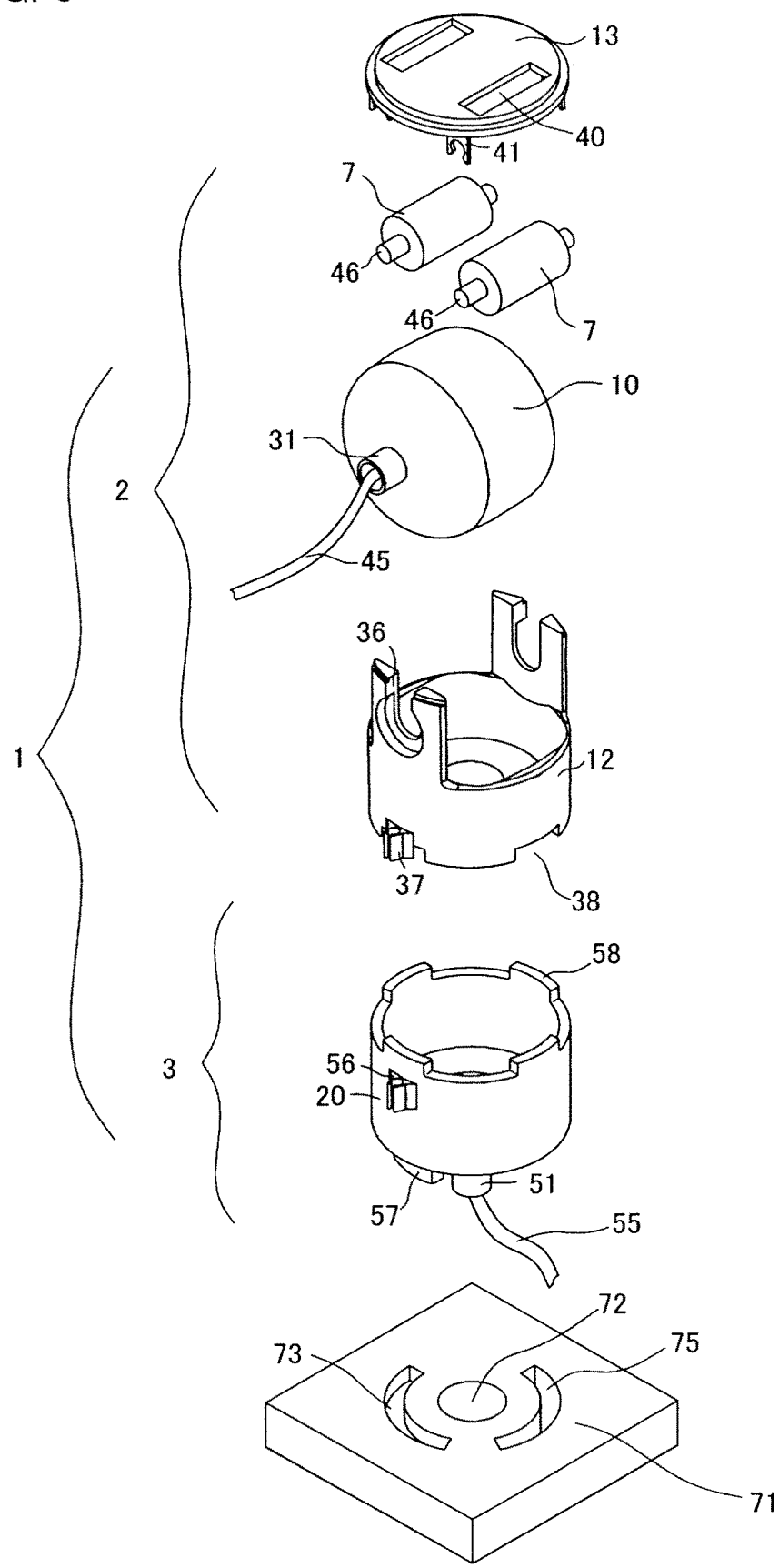
FIG. 5 is an exploded perspective view of the conveyance device of FIG. 1.

As illustrated in FIGS. 4 and 5, the energizing mechanism unit 2 includes the energizing mechanism side motor 10, a motor holding member 12, two rollers 7, and a lid member 13.

The energizing mechanism side motor 10 is an outer rotor type motor, and the central shaft 31, a coil 32, and a magnet 33 are built in the outer body 30.

The central shaft 31 is hollow. The coil 32 is integrally attached to the central shaft 31.

The outer body 30 is a drum-shaped hollow member. An external shape of the outer body 30 is a barrel shape, and an outer diameter of an intermediate portion is larger than an outer diameter of an end portion side, and the intermediate portion has a bulged shape.

The outer body 30 is rotatably attached to the central shaft 31 with a bearing 35 interposed therebetween.

The magnet 33 is integrally attached to an inner surface of the outer body 30.

When a positional relationship between the members of the energizing mechanism side motor 10 is outlined, the central shaft 31 and the coil 32 are provided on a center side, and the magnet 33 and the outer body 30 surrounding the coil 32 are provided. Both ends of the central shaft 31 protruding from the outer body 30.

The central shaft 31 and the coil 32 do not rotate, and the magnet 33 and the outer body 30 surrounding the central shaft and the coil rotate about the central shaft 31.

As described above, the central shaft 31 is hollow. A power supply line 45 is inserted into the hollow portion, power is supplied to the internal coil 32 from the outside, and the outer body 30 rotates. In the present embodiment, the central shaft 31 coincides with a central shaft of the outer body 30.

In the present embodiment, although the entire outer body 30 is illustrated as an integrated body in terms of drawing, in practice, the outer body is often divided into several members since the coil 32 and the like need to be inserted inside. The outer body 30 may be formed by nesting a plurality of tubes.

The motor holding member 12 is a tube having an outer diameter larger than the entire length. Both ends of the motor holding member 12 are released. In the motor holding member 12, a locking groove 36 is provided at a position facing the peripheral portion on the upper end side with reference to the posture at the time of installation.

In the motor holding member 12, an engagement recess 38 is formed in a peripheral portion on a lower end side with reference to the posture at the time of installation. A cable holding portion 37 is provided on a side surface of the motor holding member 12.

The lid member 13 has a circular planar shape, and two lines of rectangular openings 40 are formed in parallel. A roller receiving portion 41 is provided on a side surface of the lid member 13.

A shaft 46 protrudes from both ends of the roller 7.

Next, a positional relationship between the members constituting the energizing mechanism unit 2 will be described.

In the energizing mechanism unit 2 of the present embodiment, the energizing mechanism side motor 10 is disposed on an upper side of the motor holding member 12 with reference to the posture at the time of installation, and the central shaft 31 protruding from both ends of the energizing mechanism side motor 10 is engaged with the locking groove 36 of the motor holding member 12. A locking member (not illustrated) is provided between the central shaft 31 of the energizing mechanism side motor 10 and the locking groove 36 of the motor holding member 12, and the central shaft 31 is not rotatable with respect to the motor holding member 12.

Two rollers 7 are arranged at an upper portion of the energizing mechanism side motor 10, and the lid member 13 is installed on the two rollers.

The shaft 46 of the roller 7 is rotatably supported by the roller receiving portion 41 of the lid member 13. The roller 7 is held in the horizontal posture, and an upper side thereof is exposed from the opening 40 of the lid member 13.

On the other hand, a lower portion of the roller 7 is in contact with the energizing mechanism side motor 10. Thus, when the energizing mechanism side motor 10 rotates, the roller 7 rotates by receiving power transmission from the energizing mechanism side motor 10.

Next, the rotation mechanism unit 3 will be described.

In the present embodiment, the rotation mechanism unit 3 can be said to be the rotation mechanism side motor 20 itself. The rotation mechanism side motor 20 is an outer rotor type motor, and a central shaft 51, a coil 52, and a magnet 53 are built in the outer body 50.

The outer body 50 of the rotation mechanism side motor 20 has a special shape. In the present embodiment, the outer body 50 of the rotation mechanism side motor 20 includes a cavity 60 that covers the periphery of the coil 52 and a recess 61 that covers a lower portion of the energizing mechanism side motor 10.

That is, the outer body 50 of the rotation mechanism side motor 20 has the bowl-shaped recess 61 on the upper side and the cavity 60 on the lower side with reference to the posture at the time of installation.

An engagement protrusion 58 is formed on a peripheral wall of the recess 61.

A protrusion 57 is provided at a lower end of the outer body 50. A cable holding portion 56 is provided on a side surface of the outer body 50.

The central shaft 51 is hollow. The coil 52 is integrally attached to the central shaft 51. The outer body 50 is rotatably attached to the central shaft 51 with a bearing 62 interposed therebetween in a state where a region of the coil 52 is included in the cavity 60.

The magnet 53 is integrally attached to an inner surface of the cavity 60 of the outer body 50.

When a positional relationship between the members of the rotation mechanism side motor 20 is outlined, the central shaft 51 and the coil 52 are provided on the center side, and the magnet 53 and the cavity 60 of the outer body 50 surrounding the coil 52 are provided. An upper end of the central shaft 51 is accommodated in the recess 61 on the upper side of the outer body 50. The upper end of the central shaft 51 protrudes from the lower portion of the outer body 50.

The central shaft 51 and the coil 52 do not rotate, and the magnet 53, the outer body 50 surrounding the central shaft, and the coil rotate about the central shaft 51.

As described above, the central shaft 51 is hollow. A power supply line 55 is inserted into the hollow portion, power is supplied to the internal coil 52 from the outside, and the outer body 50 rotates. In the present embodiment, the central shaft 51 coincides with the central shaft of the outer body 50.

In the present embodiment, although the entire outer body 50 is illustrated as an integrated body in terms of drawing, in practice, the outer body is often divided into several members since the coil 52 and the like need to be inserted inside. The outer body 50 may be formed by nesting a plurality of tubes.

Next, postures and positional relationships of the energizing mechanism unit 2 and the rotation mechanism unit 3 will be described.

As illustrated in FIG. 1, the rotation mechanism unit 3 is installed such that the recess 61 faces upward and the central shaft 51 is in the vertical posture. The energizing mechanism unit 2 is installed at an upper portion of the rotation mechanism unit 3 while the central shaft 31 is held in the horizontal posture. That is, the energizing mechanism unit 2 is placed on the rotation mechanism unit 3, and the motor holding member 12 of the energizing mechanism unit 2 is installed coaxially with the outer body 50 of the rotation mechanism side motor 20.

The lower portion of the energizing mechanism side motor 10 of the energizing mechanism unit 2 enters the recess 61 of the rotation mechanism unit 3, and the engagement protrusion 58 of the rotation mechanism unit 3 is engaged with the engagement recess 38 of the motor holding member 12.

Figure 6:
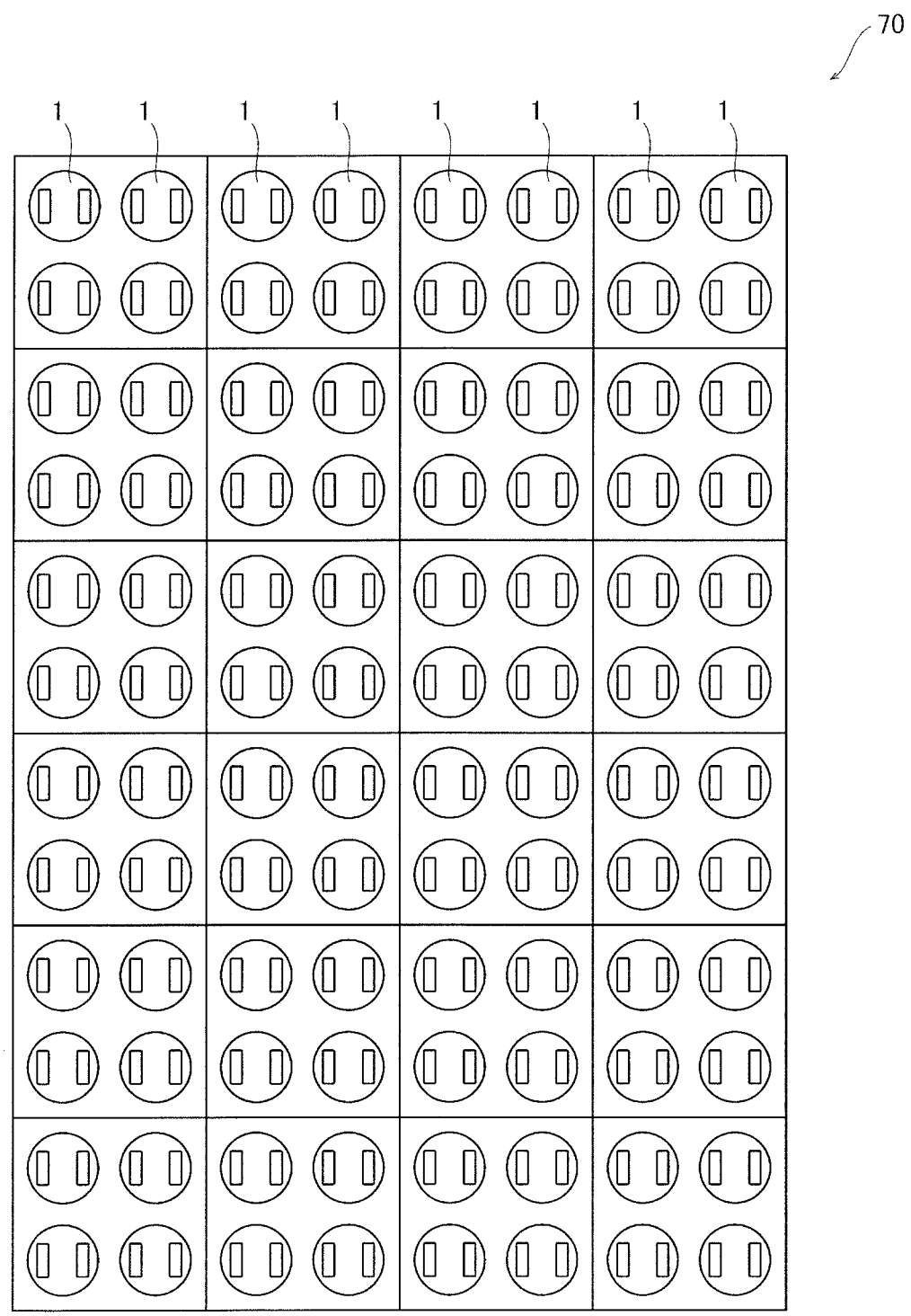
FIG. 6 is a plan view of the planar conveyance apparatus according to the embodiment of the present invention.

A conveyance device 1 of the present embodiment is desirably used for a planar conveyance apparatus 70 by arranging a plurality of the planar conveyance devices 1 in a planar manner as illustrated in FIG. 6.

As illustrated in FIGS. 4 and 5, the planar conveyance apparatus 70 includes a base member 71. A central hole 72 and an arcuate long hole 73 having the central hole 72 as a center are provided in the base member. A cable insertion hole 75 is also provided.

The central shaft 51 protruding from a lower portion of the rotation mechanism unit 3 of the conveyance device 1 is engaged with the central hole 72 of the base member 71. A locking member (not illustrated) is provided between the central hole 72 of the base member 71 and the central shaft 51, and the central shaft 51 is not rotatable with respect to the base member 71.

The protrusion 57 protruding from the lower portion of the rotation mechanism unit 3 is engaged with the arcuate long hole 73 of the base member 71. The power supply line 55 of the rotation mechanism unit 3 is led out from the central shaft 51 to the outside through the central hole 72 of the base member 71. The power supply line 45 of the energizing mechanism unit 2 exits from the central shaft 31, is held by the cable holding portions 37 and 56, and is led out to the outside through the cable insertion hole 75.

Power is individually supplied from the outside to each conveyance device 1 of the planar conveyance apparatus 70. That is, power is individually supplied to the energizing mechanism side motor 10 and the rotation mechanism side motor 20 of each conveyance device 1.

When power is supplied to the energizing mechanism side motor 10, the energizing mechanism side motor 10 rotates, and the roller 7 exposed to the upper portion rotates. The on or off and speed of the energizing mechanism side motor 10 is controlled by a control device (not illustrated).

When power is supplied to the rotation mechanism side motor 20, the outer body 50 of the rotation mechanism side motor 20 rotates, and the upper motor holding member 12 engaged with the outer body rotates to change an orientation of the energizing mechanism unit 2, and the conveyance direction of the article changes.

Pulse control or vector control are performed on the rotation mechanism side motor 20 by a control device (not illustrated), and the rotation mechanism side motor rotates in a certain angular range.

A load presence sensor (not illustrated) corresponding to each conveyance device 1 is provided in the planar conveyance apparatus 70 of the present embodiment.

When the article arrives on any one of the conveyance devices 1 of the planar conveyance apparatus 70, the rotation mechanism side motor 20 rotates along the conveyance direction of the article, and the orientation of the energizing mechanism unit 2 changes. The energizing mechanism side motor 10 is activated to move the article in a desired direction.

Accordingly, the planar conveyance apparatus 70 of the present embodiment can receive an article from any direction and carry out the article in any direction.

In the embodiment described above, two rollers 7 are provided on the lid member 13.

In the present invention, the number of rollers 7 is not limited, and may be one or three or more.

Figure 16:
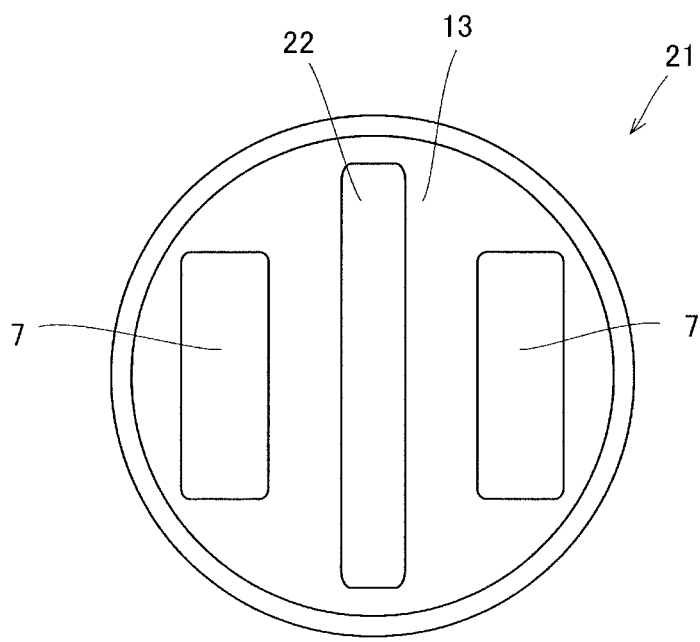
FIG. 16 is a plan view of a conveyance device according to still another embodiment of the present invention.
Figure 17:
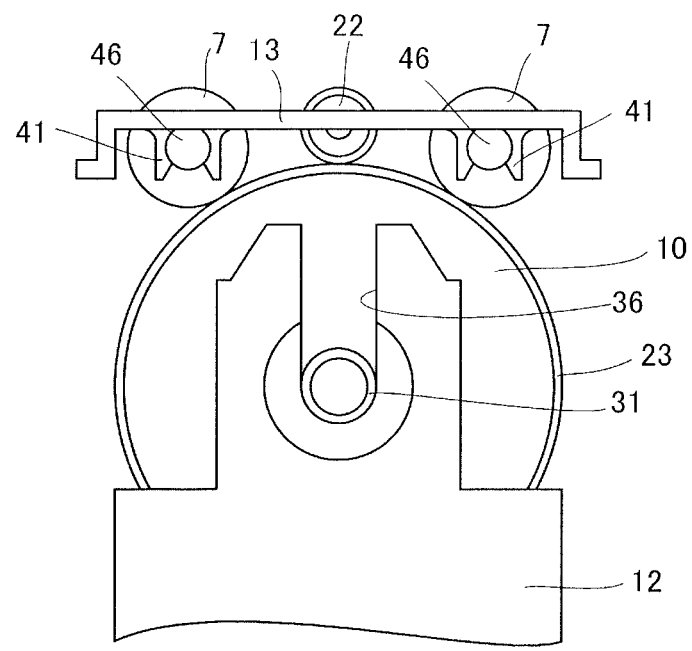
FIG. 17 is a cross-sectional view of an upper side of the conveyance device of FIG. 16.

FIGS. 16 and 17 illustrate an example in which three rollers are provided. A roller 22 is provided in a conveyance device 21 illustrated in FIGS. 16 and 17 in addition to two rollers 7 of the above-described embodiment. The roller 22 is installed between two rollers 7.

The center roller 22 has a smaller diameter than the rollers 7 on both sides. The center roller 22 has a longer overall length than the rollers 7 on both sides.

The center roller 22 is also rotatably supported by the lid member 13. However, the center roller 22 is attached to the lid member 13 with a margin in a vertical direction, and has a degree of freedom in the vertical direction. The roller 22 is held in the horizontal posture, and an upper side thereof is exposed from the opening of the lid member 13.

On the other hand, the lower portion of the roller 22 is in contact with the energizing mechanism side motor 10. Here, since the roller 22 has the degree of freedom in the vertical direction, a contact pressure between the roller 22 and the energizing mechanism side motor 10 is small when there is no article (conveyance object) on the roller.

On the other hand, when the article (conveyance object) rides on the roller 22, the roller 22 is energized toward the energizing mechanism side motor 10 by a weight of the article, and a bonding force between the roller and the energizing mechanism side motor increases. As a result, the slippage of the roller 22 is reduced, and the roller 22 strongly rotates to energize the article on the roller.

As described above, the reason why the center roller 22 is configured to be vertically movable is that it is difficult to bring three rollers 7 and 22 into contact with the circular outer body 30 simultaneously and uniformly due to dimensional tolerance.

In the energizing mechanism side motor 10 adopted in the conveyance device 21, a friction application member (friction imparting member) 23 is provided on the outer body 30, and the friction application member 23 comes into contact with the rollers 7 and 22. The friction application member 23 is made of a material having a high friction coefficient such as rubber.

The friction application member 23 is a part of the outer body 30, and rotates integrally with the other portion of the outer body 30.

In the conveyance device 21 of the present embodiment, the sliding between the outer body 30 and the rollers 7 and 22 is small, and the rotational force of the energizing mechanism side motor 10 can be more efficiently transmitted to energize the article.

Figure 18:
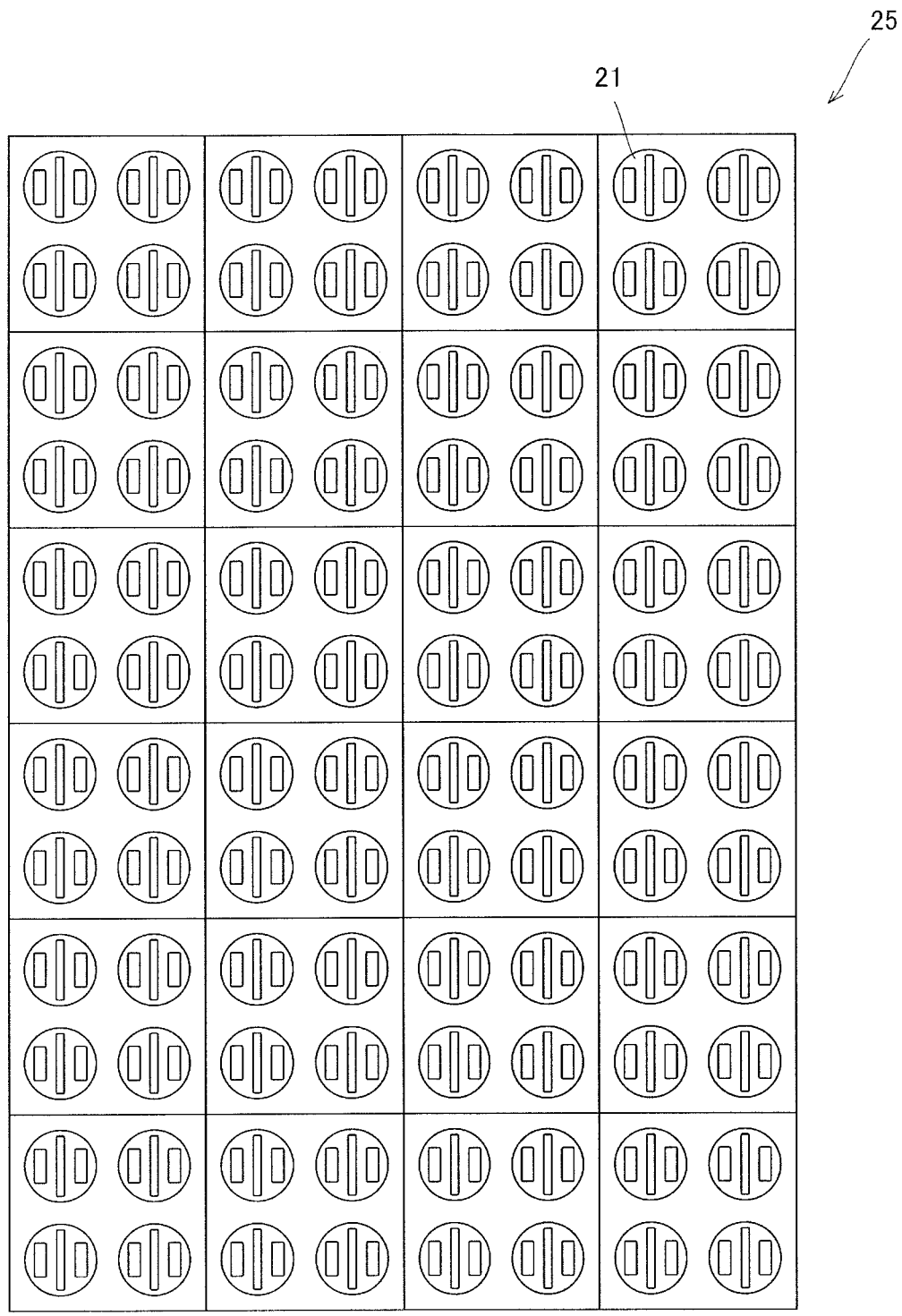
FIG. 18 is a plan view of a planar conveyance apparatus according to still another embodiment of the present invention.

FIG. 18 is a plan view of the planar conveyance apparatus 25 in which the conveyance devices 21 are arranged in a planar manner.

The conveyance device 1 described above adopts a structure in which the rollers 7 that freely rotate are installed on the outer body 30 of the energizing mechanism side motor 10 and the rollers 7 are rotated by the rotational force of the outer body 30 to energize the article.

That is, in the conveyance device 1 described above, the energizing mechanism side motor 10 is disposed such that the central shaft of the outer body 30 is in a substantially horizontal posture, and the outer body 30 energizes the article by coming into contact with the article using the rotor (roller 7) that freely rotates interposed therebetween.

However, the present invention is not limited to this configuration, and the outer body 30 may energize the article by coming into direct contact with the article.

Figure 7:
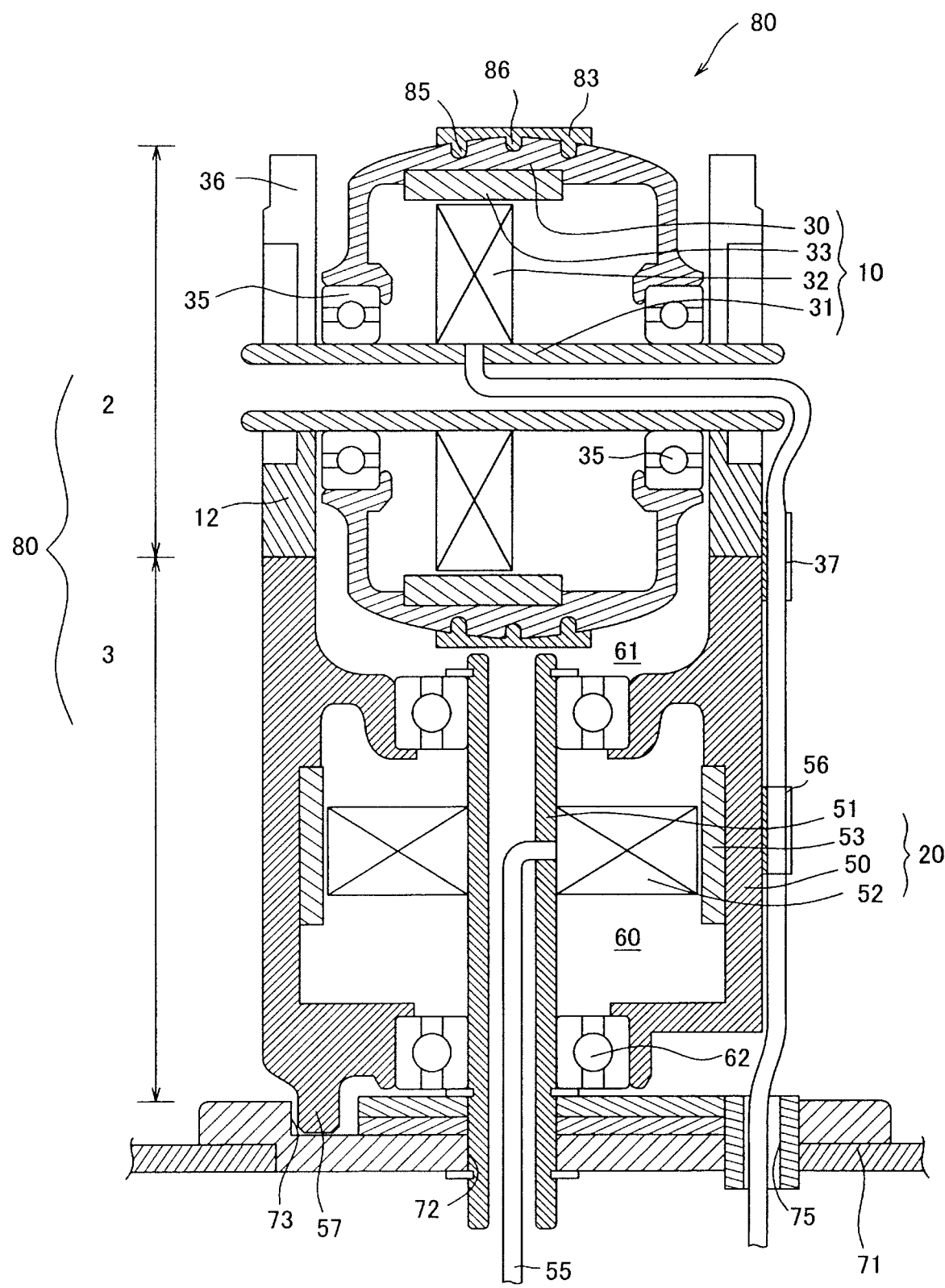
FIG. 7 is a front cross-sectional view of a conveyance device (including a base member of a planar conveyance apparatus) according to another embodiment of the present invention.

A conveyance device 80 illustrated in FIG. 7 energizes the article by bringing the outer body 30 into direct contact with the article. The conveyance device 80 illustrated in FIG. 7 does not have the rollers 7 described above, and the outer body 30 of the energizing mechanism side motor 10 is directly exposed to the outside and comes into contact with the article.

In the energizing mechanism side motor 10 adopted in the conveyance device 80 of the present embodiment, a friction application member 83 is provided on a front surface of the outer body 30. The friction application member 83 is, for example, annular rubber, and is wound around a front surface of a main body portion of the outer body 30. In the present embodiment, an engagement groove 85 is provided on the front surface of the main body portion of the outer body 30, and a rib 86 provided on an inner periphery of the friction application member 83 is engaged with the engagement groove 85.

Since the other portions of the conveyance device 80 are the same as the portions of the conveyance device 1 described above, the same members are denoted by the same reference signs, and redundant description will be omitted.

In the embodiment described above, the engagement protrusion and the engagement recess are engaged by providing the engagement protrusion 58 in the rotation mechanism unit 3 and providing the engagement recess 38 in the motor holding member 12. This configuration is merely an example of a structure in which the rotational force of the rotation mechanism unit 3 is conducted to the energizing mechanism unit 2 side, and any of the rotation mechanism unit and the motor holding member may have the recess or the projection. The rotation mechanism unit 3 and the energizing mechanism unit 2 may be integrally coupled with a screw, an adhesive, or the like. The energizing mechanism side motor 10 may be directly supported by the upper portion of the outer body 50 of the rotation mechanism side motor 20.

Each of the energizing mechanism side motor 10 and the rotation mechanism side motor 20 includes the magnets 33 and 53, but may be a coil instead of the magnet. That is, the energizing mechanism side motor 10 and the rotation mechanism side motor 20 may be reluctance motors. When a reluctance motor is adopted as a motor type, coils are attached to the inner surfaces of the outer bodies 30 and 50.

Figure 8:
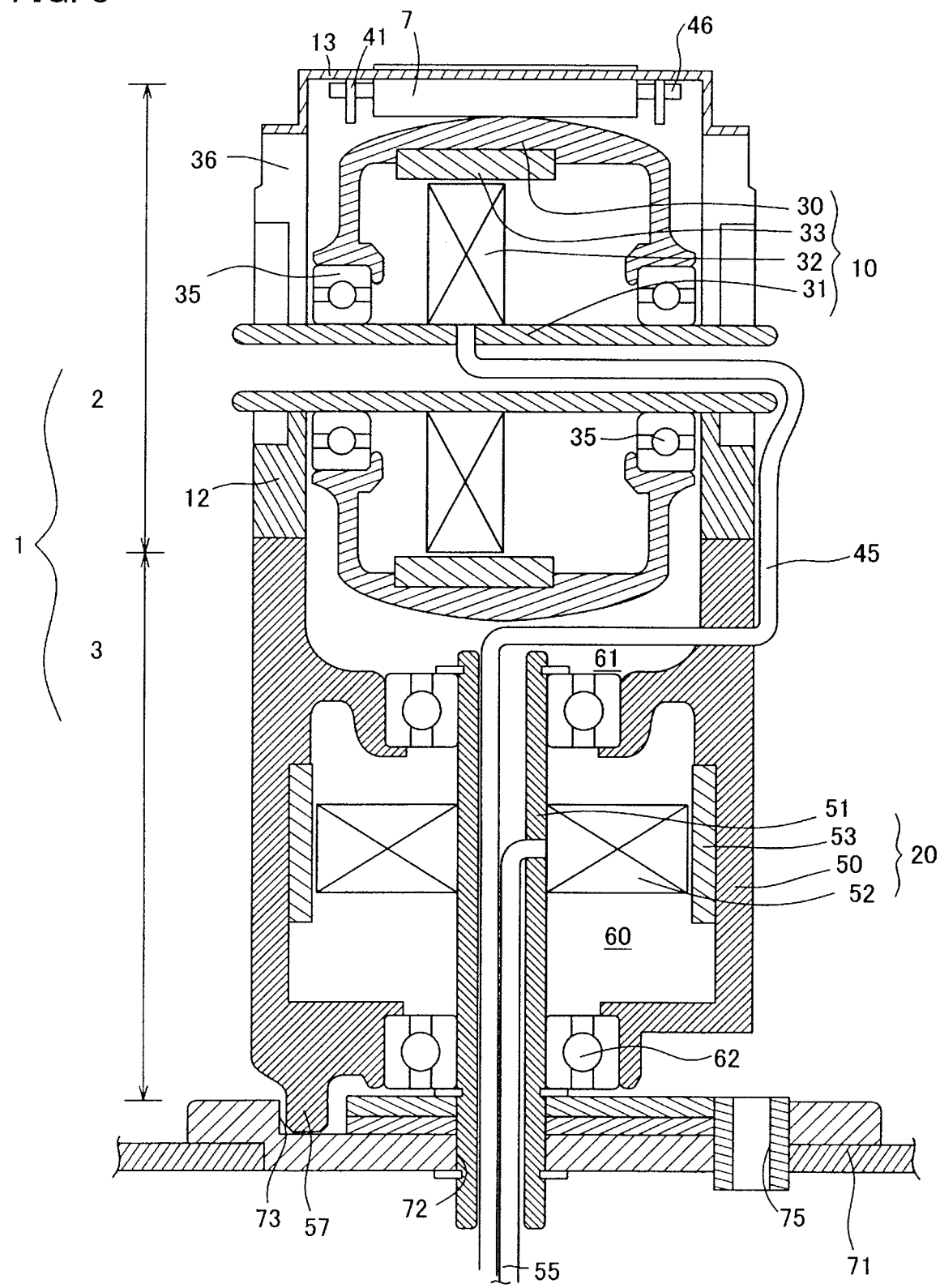
FIG. 8 is a front cross-sectional view of a conveyance device (including a base member of a planar conveyance apparatus) according to still another embodiment of the present invention.

In the embodiment described above, the power supply line 45 on the energizing mechanism unit 2 side is held by the cable holding portions 37 and 56 provided on the outer side. However, as illustrated in FIG. 8, an opening 63 may be provided in a part of the outer body 50 or the like to guide the power supply line to the inside of the outer body 50, and may lead the power supply line to the outside via the central shaft 51 of the rotation mechanism unit 3.

According to the present embodiment, the power supply line 45 is organized.

Each of the conveyance devices 1 and 80 described above does not have a power transmission member such as a gear or a belt, has a simple structure, and has a small number of parts.

Thus, manufacturing and maintenance are easy.

In each of the conveyance devices 1 and 80 described above, although both the energizing mechanism unit 2 and the rotation mechanism unit 3 are the outer rotor type motors, either one may be a motor of another type or may have a gear or the like in a drive mechanism.

Next, a planar conveyance apparatus 65 of another recommended embodiment of the present invention will be described with reference to FIG. 9 and subsequent drawings.

In the planar conveyance apparatus 65, a plurality of top face members 67 is laid, and a plurality of energizing units (rollers 7) are arranged on the top face members 67.

The planar conveyance apparatus 65 includes the plurality of top face members 67 and a plurality of base members 68. A large number of pillar members 76 are provided between the top face member 67 and the base member 68, and the top face member 67 is supported by the pillar member 76. Some of the pillar members 76 straddle and support the plurality of top face members 67 at boundaries across the adjacent top face members 67. The plurality of conveyance devices 1 are arranged between the top face members 67 and the base members 68.

A common bottom plate 77 is provided in a lowermost layer of the planar conveyance apparatus 65.

Figure 11:
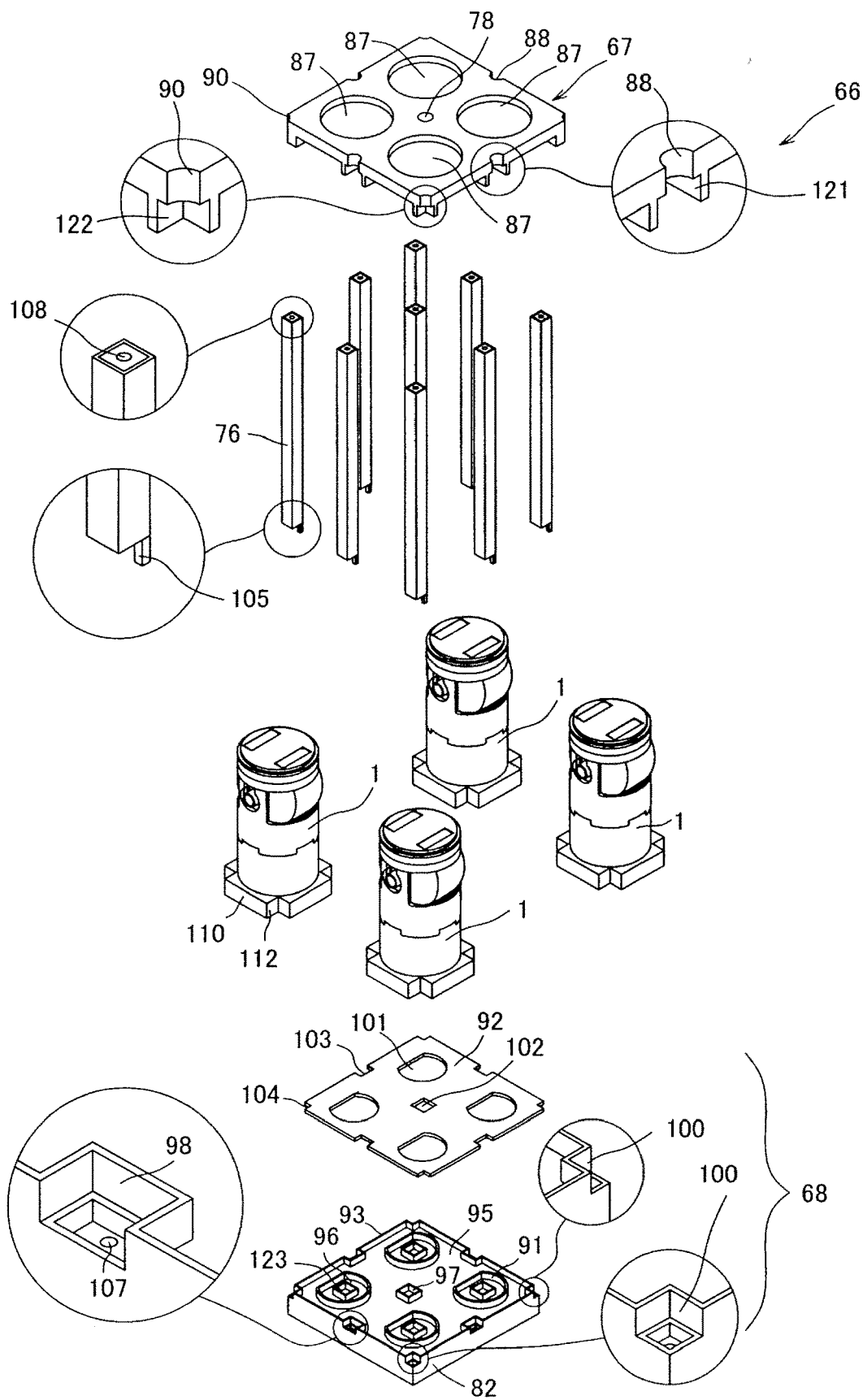
FIG. 11 is an exploded perspective view of one section of the planar conveyance apparatus illustrated in FIG. 9.
Figure 12:
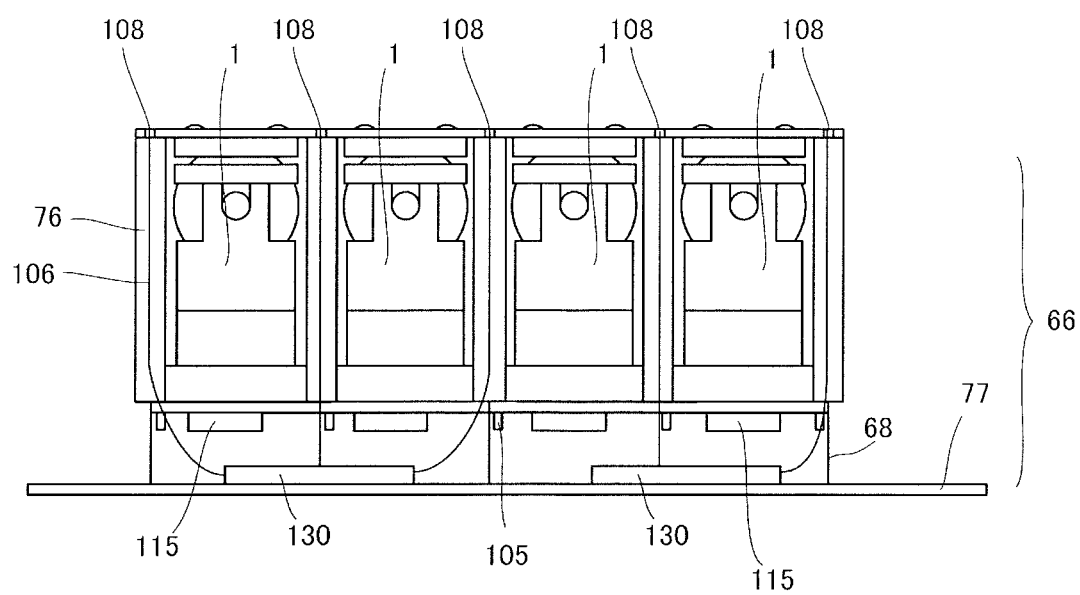
FIG. 12 is a cross-sectional view of two sections of the planar conveyance apparatus illustrated in FIG. 9.
Figure 13A:
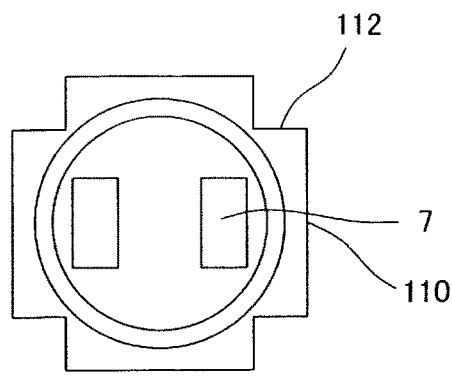
Figure 13B:
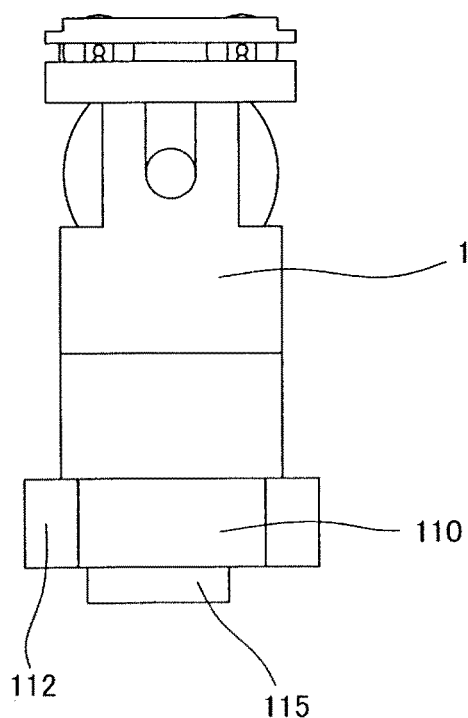
Figure 13C:
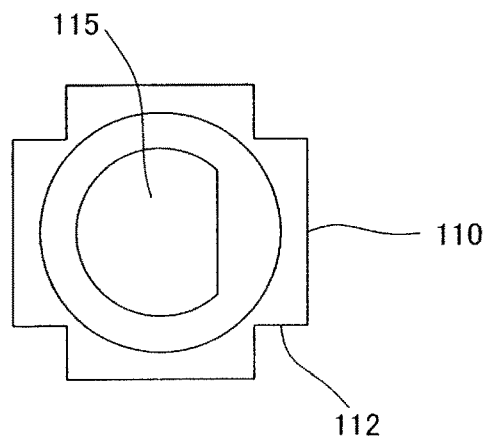

As illustrated in FIG. 11, a sensor 108 is attached to the pillar member 76. A signal line 106 is present in the pillar member 76. As illustrated in FIG. 11, a terminal 105 is provided at a lower portion of the pillar member 76, and as illustrated in FIG. 12, the terminal 105 and the signal line 106 are connected.

As illustrated in FIG. 11, a terminal receiving member 107 is provided in the base member 68, and the terminal 105 of the pillar member 76 is inserted into the terminal receiving member 107 and is electrically connected. As illustrated in FIG. 12, a control board 130 is disposed in the base member 68.

Figure 9:
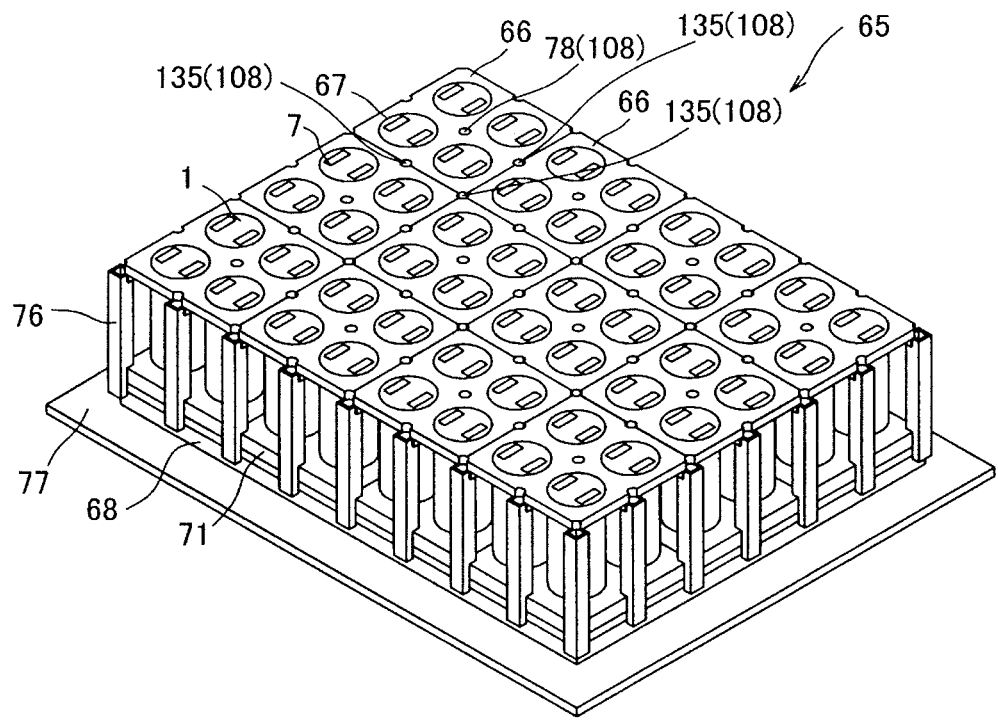
FIG. 9 is a perspective view of a planar conveyance apparatus according to another embodiment of the present invention.
Figure 10:
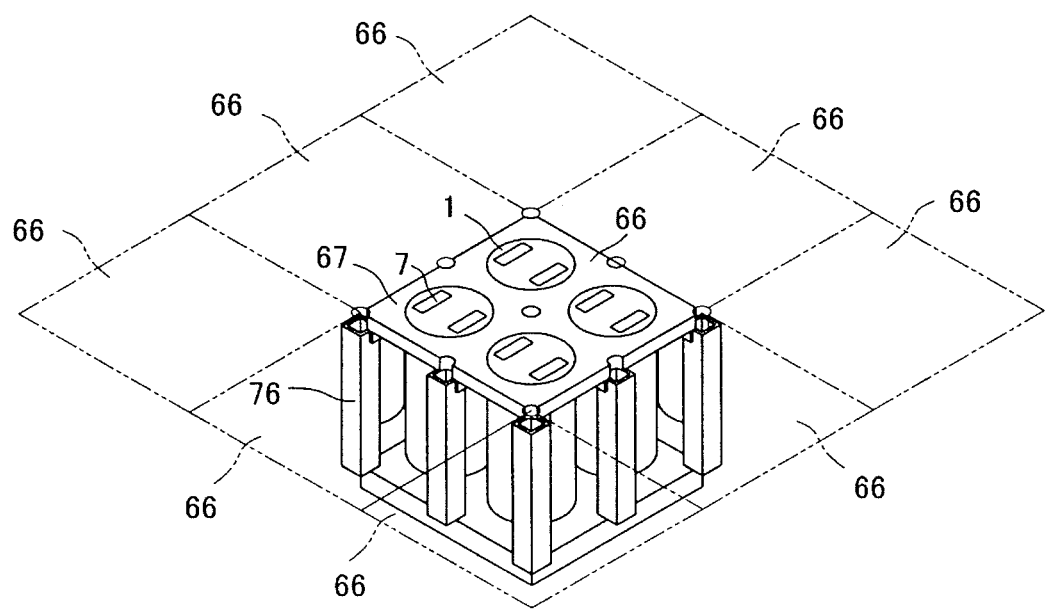
FIG. 10 is a perspective view of one section of the planar conveyance apparatus illustrated in FIG. 9.

As illustrated in FIG. 9, the planar conveyance apparatus 65 of the present embodiment is divided into a plurality of blocks 66. Specifically, the planar conveyance apparatus 65 is divided into 12 blocks 66.

As illustrated in FIG. 11, each block 66 includes one top face member 67, one base member 68, and four conveyance devices 1.

As illustrated in FIG. 11, most of the pillar members 76 are provided on boundary lines of the blocks 66, and the adjacent blocks 66 share most of the pillar members 76.

In the present embodiment, the sensor 108 is provided on each pillar member 76.

Hereinafter, each member will be described.

Figure 14:
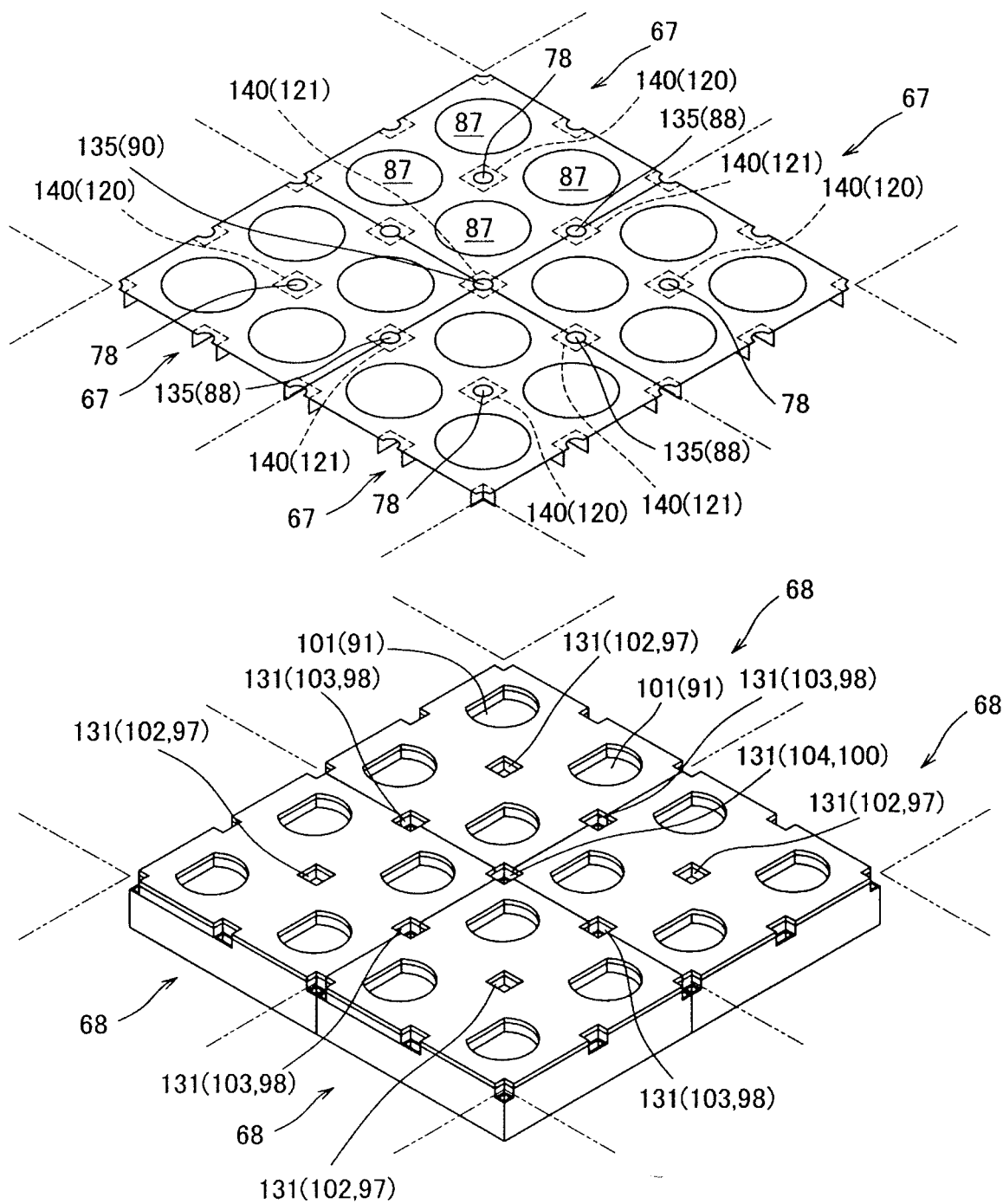
FIG. 14 illustrates a top face member and a base member of the planar conveyance apparatus illustrated in FIG. 9 and is a perspective view illustrating where a plurality of top face members and a plurality of base members are combined.
Figure 15:
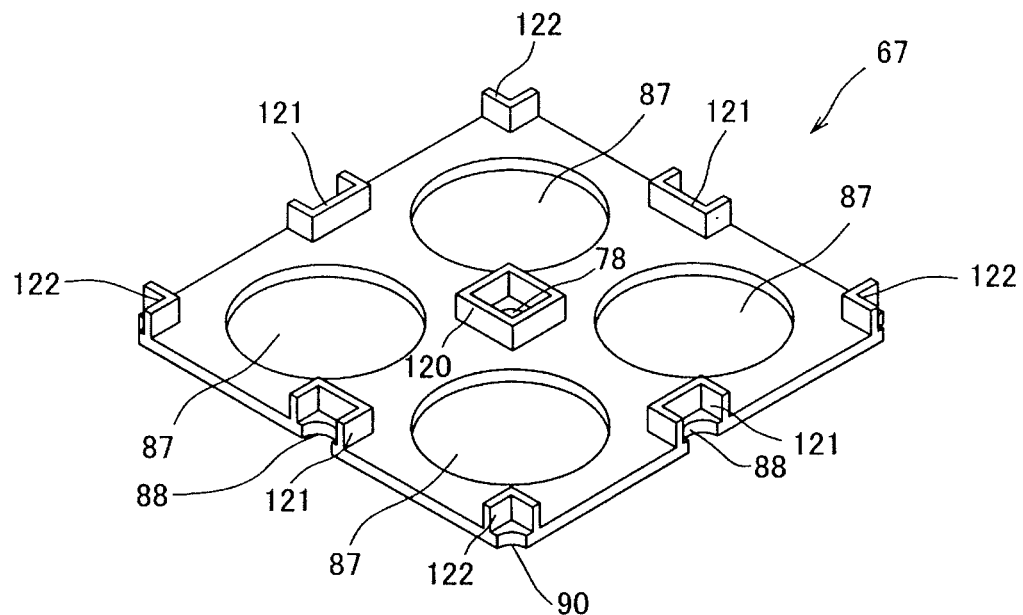
FIG. 15 is a perspective view of the top face member of the planar conveyance apparatus illustrated in FIG. 9 as observed from a back surface side.

The top face member 67 is a plate-shaped member made of metal or resin, and has a substantially square planar shape as illustrated in FIGS. 11, 14, and 15. In a central portion of the top face member 67, four large circular openings 87 are provided in a matrix.

A small circular opening 78 is provided at a center of the top face member 67. Notches 88 and 90 are provided on each side of the top face member 67.

The notch 88 at the center of each side is a semicircle. The notch 90 provided at the corner of each side is a quadrant.

Each of the notches 88 and 90 provided on each side has a shape that forms a small circle when these notches are combined with the notches 88 and 90 provided in the top face member 67 of the adjacent block 66.

As illustrated in FIG. 15, on a back surface side of the top face member 67, an upper support frame 120 having a square edge is provided around a central circular small opening 78. Similarly, upper frame pieces 121 and 122 are provided on the back surface side of each side of the top face member 67.

In the present embodiment, the square upper support frame 120 provided at the center of the back surface of the top face member 67 is a frame having a reference size. Each of the upper frame pieces 121 and 122 provided on each side has a shape that forms a square having a reference size when these frame pieces are combined with the upper frame pieces 121 and 122 provided on the top face member 67 of the adjacent block 66.

That is, the upper frame pieces 121 and 122 provided on each side constitutes a part of the square upper support frame having the reference size.

Specifically, the upper frame piece 121 provided at the central portion of each side is a rectangle having a half size of the square having the reference size, and has a "U" shape having a long side portion and a short side portion.

The upper frame piece 122 provided at a corner of each side is a square having a size of ¼ of the square having the reference size, and has a triangular shape surrounded by two short side portions.

The base member 68 includes a main body portion 82 and a lid member 92.

The main body portion 82 is made of resin, and has a peripheral wall portion 93 and a bottom portion 95. In the main body portion 82, four engagement portions 91 are provided in a matrix. The engagement portion 91 is a frame formed on the bottom portion 95 and protrudes from the bottom portion 95. The engagement portion 91 is a frame, and an inner surface thereof is an engagement recess 96 having a specific shape. The engagement recess 96 has a shape other than a circular shape, and has a substantially "D" shape in which a part of a circle is missing in the present embodiment.

There is an opening 123 at the bottom of the engagement recess 96 and communicates with the back surface side.

A pillar insertion frame 97 surrounded by a square is provided at the center of the main body portion 82. On each side of the main body portion 82, pillar insertion frame pieces 98 and 100 partially missing are provided.

In the present embodiment, the square pillar insertion frame 97 provided at the center has a shape forming a square having a reference size.

Each of the pillar insertion frame pieces 98 and 100 provided on each side has a shape that forms a square having a reference size when these pillar insertion frame pieces are combined with the pillar insertion frame pieces 98 and 100 provided on the main body portion 82 of the adjacent base member 68.

That is, the pillar insertion frame pieces 98 and 100 provided on each side constitute a part of the square opening having the reference size.

Specifically, the pillar insertion frame piece 98 provided at the central portion of each side has a shape forming a rectangle having a half size of the square having the reference size, and has a "U" shape having a long side portion and a short side portion.

The pillar insertion frame piece 100 provided at the corner of each side is a square having a size of ¼ of the square having the reference size, and has a triangular shape surrounded by two short side portions.

The terminal receiving member 107 is provided at the bottom portion of each pillar insertion frame 97, and the pillar insertion frame pieces 98 and 100.

The lid member 92 is a plate made of metal, and covers the main body portion 82. Openings 101, 102, 103, and 104 at positions and sizes corresponding to the engagement portion 91 of the main body portion 82, the pillar insertion frame 97, and the pillar insertion frame pieces 98 and 100 are provided in the lid member 92.

The pillar member 76 is a pillar made of resin and having a square cross-sectional shape. The inside of the pillar member 76 is hollow.

The sensor 108 is provided at the top of the pillar member 76. The sensor 108 is a photoelectric sensor, includes a light emitting unit and a light receiving unit (not illustrated), and determines whether or not there is an object in front. In the present embodiment, the sensor is used in order to determine whether or not there is the object (conveyance object) thereon.

The terminal 105 protrudes from the bottom portion of the pillar member 76.

The signal line 106 is provided inside the pillar member 76, and the upper sensor 108 and the lower terminal 105 are connected by the signal line 106. The signal line 106 may be installed outside the pillar member 76 and along the pillar member 76.

A base member 110 having a shape different from the shape in the above-described embodiment is integrally attached to the conveyance device 1. The base member 110 has a substantially square planar shape, and a notch 112 is provided at each corner. On a front surface side of the base member 110, there is a recess into which the lower portion of the conveyance device 1 is fitted.

An engagement protrusion 115 protrudes from a back surface of the base member 110. The shape of the engagement protrusion 115 matches the shape of the engagement portion 91 of the main body portion 82.

Next, a positional relationship between the members constituting the planar conveyance apparatus 65 will be described.

In the planar conveyance apparatus 65 of the present embodiment, the common bottom plate 77 is disposed in the lowermost layer, and other members are installed and integrated on the common bottom plate 77.

That is, the members constituting the block 66 are laid on the common bottom plate 77. For example, in the planar conveyance apparatus 65 illustrated in FIG. 9, members constituting 12 blocks 66 are attached on the common bottom plate 77.

A lower view of FIG. 14 illustrates a state where base members 68 are laid on the common bottom plate (not illustrated) 77.

As is apparent from FIG. 14, when a state where the base members 68 are laid is viewed, quadrangular pillar insertion frames 131 are arrayed in a matrix.

That is, the pillar insertion frame 97 and an opening (lid member) 102 corresponding to the pillar insertion frame are provided at the center of each base member 68. The pillar insertion frame 97 and the opening 102 corresponding to the pillar insertion frame have a quadrangular shape similar to the cross-sectional shape of the pillar member 76, and the pillar insertion frame 97 alone constitutes the pillar insertion frame 131.

As described above, the pillar insertion frame pieces 98 and 100 and the openings (lid members) 103 and 104 corresponding to the pillar insertion frame pieces are provided at the side portions of each base member 68. When attention is paid to the pillar insertion frame piece 98 provided at the central portion of each side, the pillar insertion frame piece 98 and the like have a rectangular shape, but are combined with the pillar insertion frame piece 98 of the adjacent base member 68 to have a quadrangular shape similar to the cross-sectional shape of the pillar member 76 in appearance. Thus, the pillar insertion frame 131 is formed.

When attention is paid to the pillar insertion frame piece 100 and the like provided at the corner of each side, the pillar insertion frame piece 100 has a small triangular shape, but is combined with the pillar insertion frame piece 100 at each corner of the adjacent base member 68 to have a quadrangular shape similar to the cross-sectional shape of the pillar member 76 in appearance. Thus, the pillar insertion frame 131 is formed.

Thus, as described above, in the state where the base members 68 are laid, the quadrangular pillar insertion frames 131 are arrayed in a column.

An upper view of FIG. 14 illustrates a state where the top face members 67 are laid.

As is apparent from FIG. 14, when a state where the top face members 67 are laid is viewed, the large circular openings 87 are arrayed in a matrix.

Small openings 135 surround the large openings 87 and are arrayed in a matrix.

That is, the circular opening 78 is provided at the center of each base member 68.

As described above, there are the notches 88 and 90 in the side portions of each top face member 67. When attention is paid to the notch 88 provided at the central portion of each side, the notch 88 is semicircular, but is combined with the adjacent top face member 67. Thus, the circular opening 135 is formed in appearance.

When attention is paid to the notch 90 provided at the corner of each side, the notch 90 is a quadrangle, but is combined with the notch 90 at each corner of the adjacent top face member 67. Thus, the circular opening 135 is formed in appearance.

As indicated by a broken line in FIG. 14, in a state where the top face members 67 are laid, a quadrangular upper support frame 140 is provided on the back surface side, and the upper support frames 140 are arrayed in a matrix.

That is, the upper support frame 120 having a square edge around the circular opening 78 is provided on the back surface side of the top face member 67. The upper support frame 120 alone constitutes the upper support frame 140.

As described above, the upper frame pieces 121 and 122 are provided at the side portions of each top face member 67. When attention is paid to the upper frame piece 121 provided at the central portion of each side, the upper frame piece 121 has a rectangular shape, but is combined with the upper frame piece 121 of the adjacent top face member 67 to have a quadrangular shape similar to the cross-sectional shape of the pillar member 76 in appearance. Thus, the upper support frame 140 is formed.

When attention is paid to the upper frame piece 122 provided at the corner of each side, the upper frame piece 122 has a small triangular shape, but is combined with the upper frame piece 122 of each corner of the adjacent top face member 67 to have a quadrangle shape similar to the cross-sectional shape of the pillar member 76 in appearance. Thus, the upper support frame 140 is formed.

In the planar conveyance apparatus 65 of the present embodiment, the lower portion of each of the pillar members 76 is inserted into a quadrangular pillar insertion frame 131 arranged in a matrix at the lower portion, and the upper portion of each of the pillar members 76 is inserted into a quadrangular upper support frame 140 arranged in a matrix at the upper portion.

That is, in the planar conveyance apparatus 65 of the present embodiment, there is the quadrangular pillar insertion frame 131 formed by combining the opening of each base member 68 and the notch of each base member 68 at the lower portion, there is the quadrangular upper support frame 140 formed by combining the upper support frame 120 of each top face member 67 and the frame pieces 121 and 122 of each top face member 67 at the upper portion, and the pillar member 76 is provided between the pillar insertion frame and the upper support frame.

Four conveyance devices 1 are attached between each top face member 67 and the base member 68.

The upper portion of the conveyance device 1 is attached to the circular opening 87 of the top face member 67. When attention is paid to the lower portion of the conveyance device 1, the engagement protrusion 115 of the base member 110 is engaged with the engagement portion 91 of the main body portion 82.

When the planar conveyance apparatus 65 in the assembled state is observed from above and attention is paid to one conveyance device 1, there are sensors 108 at positions corresponding to four corners of the conveyance device 1.

That is, at one corner of an area including one conveyance device 1, the small circular opening 78 formed at the center of the top face member 67 is provided, and a distal end of the pillar member 76 is provided at a lower portion of the opening 78, and the sensor 108 is provided.

At a position on a diagonal line beyond a center point of the conveyance device 1 from the opening 78, there is the small circular opening 135 formed by collecting the notches 90 at the corners of the four top face members 67, and the pillar member 76 is provided at a lower portion of the opening 135, and the sensor 108 is provided.

At the remaining diagonal position, there is the small circular opening 135 formed by combining the notches 88 provided at the centers of the sides, and the pillar member 76 is provided in the opening 132, and the sensor 108 is provided.

Thus, in the planar conveyance apparatus 65 of the present embodiment, the sensors 108 are provided at positions corresponding to the four corners of one conveyance device 1.

As described above, in the planar conveyance apparatus 65 of the present embodiment, the lower portions of the pillar members 76 are inserted into the quadrangular pillar insertion frames and the quadrangular openings arranged in a matrix at the lower portions.

Here, as described above, the terminal 105 protrudes from the lower portion of the pillar member 76. On the other hand, the terminal receiving member 107 is provided at the bottom portion of the pillar insertion frame 97 and the pillar insertion frame pieces 98 and 100 on which the pillar member 76 is installed. Thus, the pillar members are attached to the pillar insertion frame 97 and the pillar insertion frame pieces 98 and 100, and thus, the terminals 105 of the pillar members 76 are joined to the terminal receiving members 107 of the pillar insertion frame 97 and so on.

In the present embodiment, since the control board 130 that controls the conveyance device 1 is disposed in the base member 68 and the terminal receiving member 107 is connected to the control board 130, the sensor 108 is connected to the control board 130 by attaching the pillar member 76.

EXPLANATION OF REFERENCE NUMBERS 1, 80: conveyance device
2: energizing mechanism unit
3: rotation mechanism unit
7: roller (rotor that freely rotates or energizing unit)

10: energizing mechanism side motor
12: motor holding member
20: rotation mechanism side motor
30: outer body
31: central shaft
32: coil
33: magnet
50: outer body
51: central shaft
52: coil
53: magnet
65, 70: planar conveyance apparatus
83: friction application member

The invention claimed is:

1. A conveyance device that comprises:
an energizing mechanism unit configured to energize and move an article; and
a rotation mechanism unit configured to rotate the energizing mechanism unit itself to change a moving direction of the article,
wherein the energizing mechanism unit comprises an energizing mechanism side motor,
the energizing mechanism side motor including: a coil on a center side; and an outer body surrounding the coil,
the energizing mechanism side motor being an outer rotor type motor in which the outer body rotates,
wherein the energizing mechanism side motor is disposed such that a central shaft of the outer body is in a substantially horizontal posture, and
wherein the outer body is configured to come into contact with the article directly or through a freely-rotating rotor interposed therebetween to energize the article.

2. The conveyance device according to claim 1,
wherein the rotation mechanism unit comprises a rotation mechanism side motor,
the rotation mechanism side motor including a coil on a center side and an outer body surrounding the coil,
the rotation mechanism side motor being an outer rotor type motor in which the outer body rotates,
wherein the rotation mechanism side motor is disposed such that a central shaft of the outer body is in a substantially vertical posture, and
wherein the outer body is engaged with the energizing mechanism unit directly or indirectly.

3. The conveyance device according to claim 1, further comprising a freely-rotatable roller, wherein a part of the freely-rotatable roller is configured to come into contact with the energizing mechanism side motor to energize the article.

4. The conveyance device according to claim 3, wherein one or a plurality of the rollers have a degree of freedom in a vertical direction.

5. The conveyance device according to claim 1,
wherein a friction imparting member is provided on an outer peripheral portion of the outer body of the energizing mechanism side motor, and
wherein the energizing mechanism side motor is configured to come into contact with the article to energize the article.

6. A conveyance device that comprises:
an energizing mechanism unit configured to energize and move an article; and
a rotation mechanism unit configured to rotate the energizing mechanism unit itself to change a moving direction of the article,
wherein the rotation mechanism unit comprises a rotation mechanism side motor,
the rotation mechanism side motor including a coil on a center side and an outer body surrounding the coil,
the rotation mechanism side motor being an outer rotor type motor in which the outer body rotates,
wherein the rotation mechanism side motor is disposed such that a central shaft of the outer body is in a substantially vertical posture, and
wherein the outer body is engaged with the energizing mechanism unit directly or indirectly.

7. A planar conveyance apparatus comprising a plurality of the conveyance devices according to claim 1, the plurality of the conveyance devices being arranged in a planar shape.

8. A planar conveyance apparatus comprising a plurality of the conveyance devices according to claim 6, the plurality of the conveyance devices being arranged in a planar shape.

9. The conveyance device according to claim 2, further comprising a freely-rotatable roller, wherein a part of the freely-rotatable roller is configured to come into contact with the energizing mechanism side motor to energize the article.

10. The conveyance device according to claim 9, wherein one or a plurality of the rollers have a degree of freedom in a vertical direction.

11. The conveyance device according to claim 2,
wherein a friction imparting member is provided on an outer peripheral portion of the outer body of the energizing mechanism side motor, and
wherein the energizing mechanism side motor is configured to come into contact with the article to energize the article.

* * * * *